Figure 1:
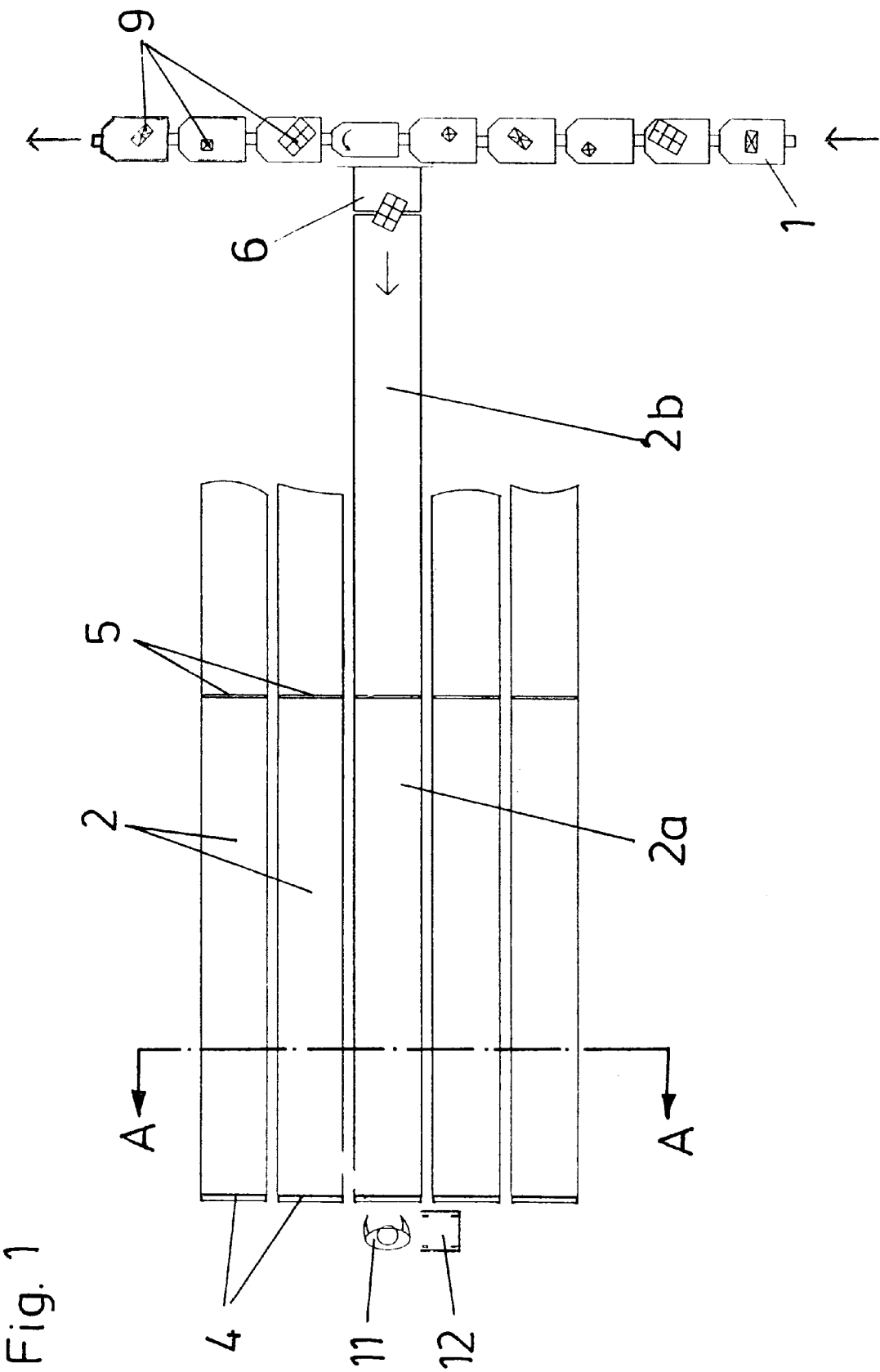

United States Patent [19]
Mörchen

[11] Patent Number: 6,070,709
[45] Date of Patent: Jun. 6, 2000

[54] DISTRIBUTOR APPARATUS

[76] Inventor: Wolfgang Mörchen, Kriemhildstrasse 18, D-90513 Zirndorf, Germany

[21] Appl. No.: 08/894,118
[22] PCT Filed: Oct. 31, 1996
[86] PCT No.: PCT/EP96/04751
  § 371 Date: Aug. 12, 1997
  § 102(e) Date: Aug. 12, 1997
[87] PCT Pub. No.: WO98/06645
  PCT Pub. Date: Feb. 19, 1998

[30] Foreign Application Priority Data

Aug. 13, 1996 [AT] Austria ................................. 1457/96

[51] Int. Cl.[7] .................................................. B65G 11/00
[52] U.S. Cl. ............................. 193/2 D; 193/4; 414/276; 99/467
[58] Field of Search .......................... 198/370.01, 370.03, 198/370.04, 370.05; 193/2 R, 3, 4, 20, 21, 25 FT, 2 L, 2 D; 414/276, 299; 99/467, 471

[56] References Cited

U.S. PATENT DOCUMENTS

| 2,730,223 | 1/1956 | MacLean . | |
| 4,205,936 | 6/1980 | Green | 414/276 |
| 5,044,267 | 9/1991 | Sollich | 99/483 |
| 5,163,360 | 11/1992 | Petz | 99/468 |
| 5,220,986 | 6/1993 | Winkler, III | 193/25 A |

*Primary Examiner*—James R. Bidwell
*Attorney, Agent, or Firm*—Hale and Dorr LLP

[57] ABSTRACT

A distributor apparatus (sorter) which distributes items supplied thereto to individual delivery locations, wherein the delivery locations are in the form of heat-insulated storage chutes (2).

14 Claims, 4 Drawing Sheets

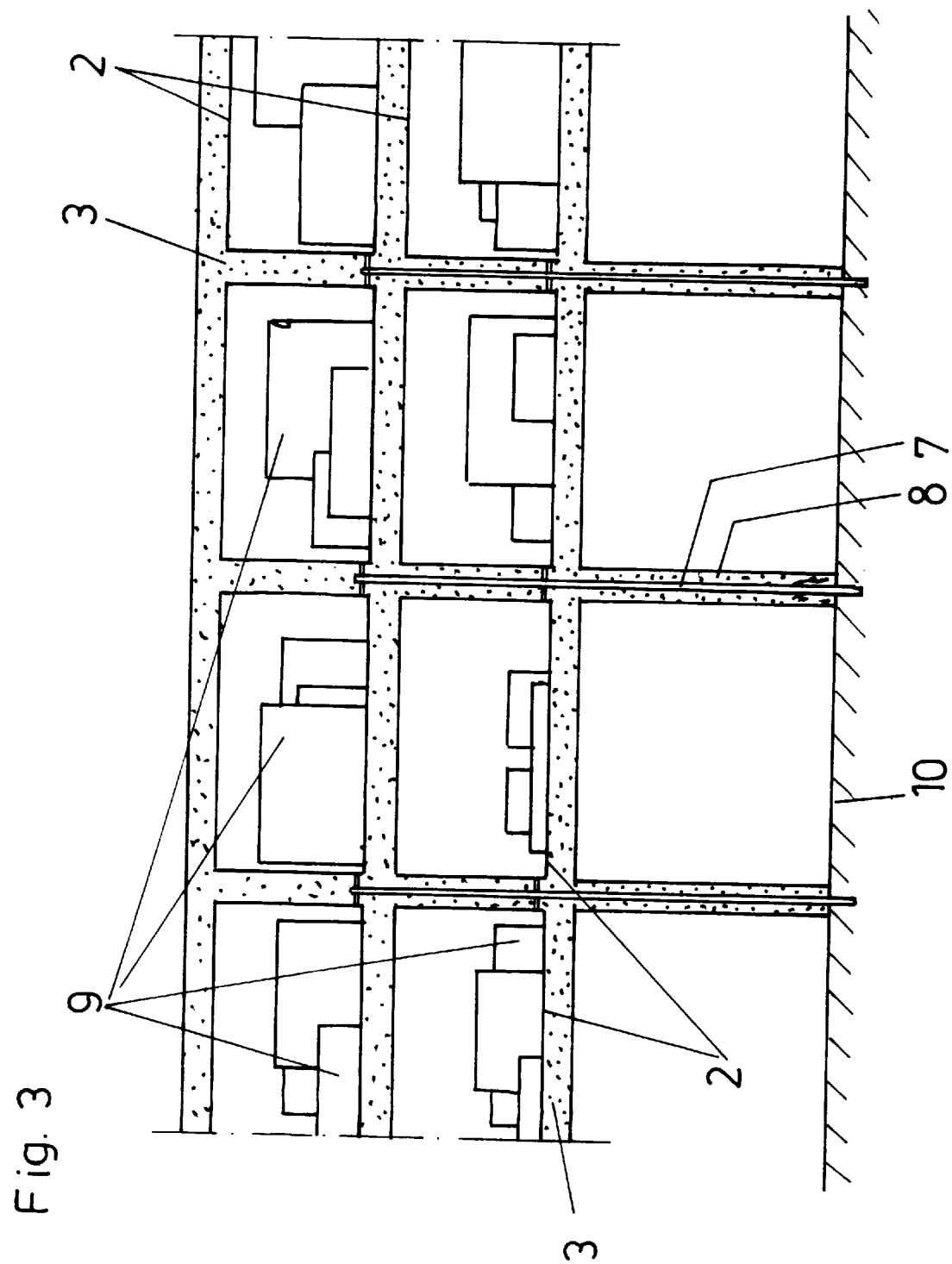

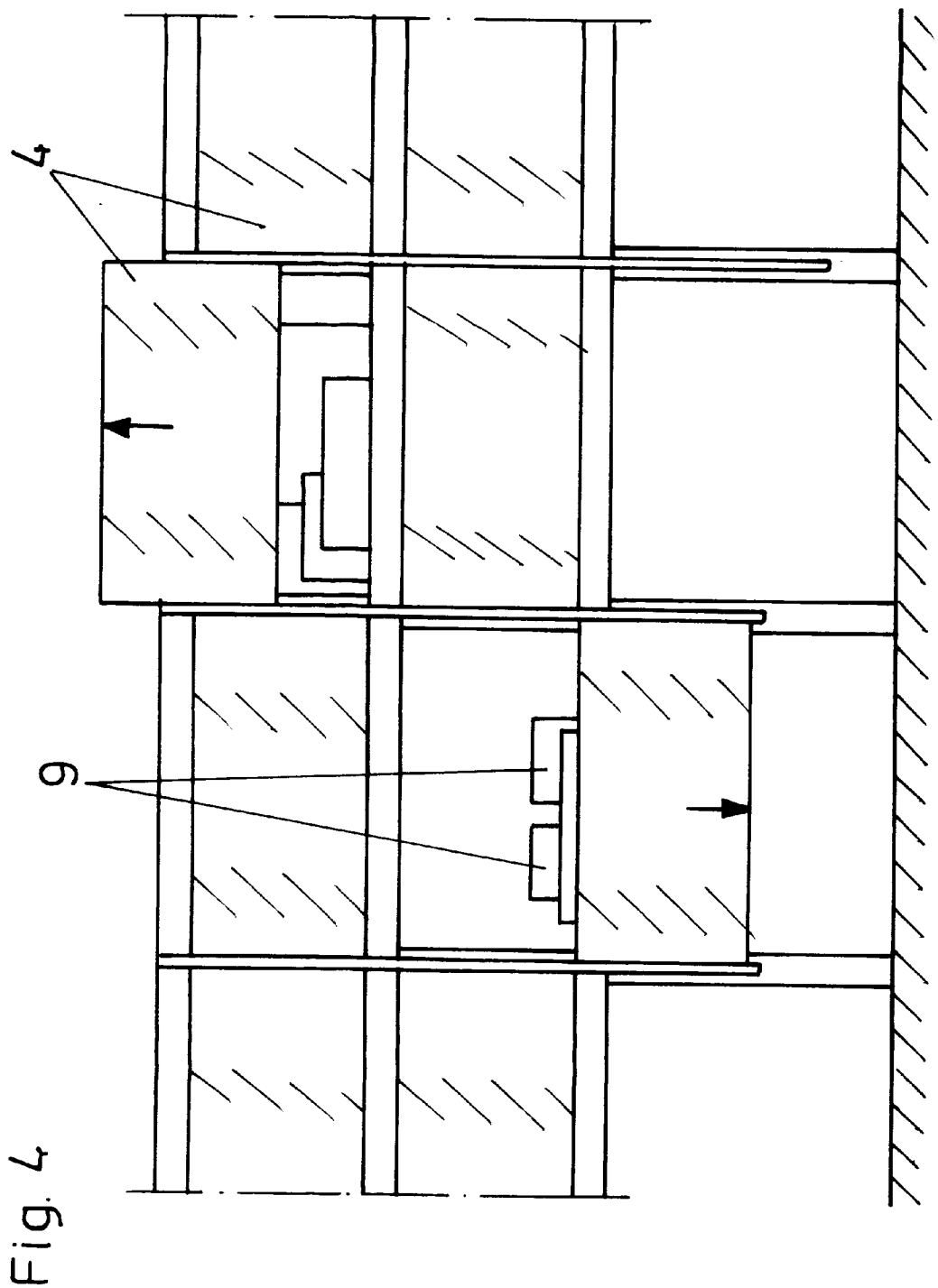

DISTRIBUTOR APPARATUS

The present invention concerns a distributor apparatus (sorter) which distributes items supplied thereto to individual delivery locations.

Mechanically operated distributor apparatuses are used to distribute individual portions of material to given delivery locations which are predetermined by a control computer. In the case of single-purpose installations for the distribution of frozen food the sorter operates at an ambient temperature of −27° C. As no interruption in the frozen chain is to be feared under those conditions, the delivery locations of the distributor apparatus can be of any desired configuration.

As however wholesalers are increasingly selling both frozen food and also dairy products and for considerations of economy want to use only a single distributor apparatus for that purpose, the requirement profile in regard to a distributor apparatus has altered greatly in recent years. In a hybrid mode of operation involving frozen food and dairy products the distributor apparatus must be operated at an ambient temperature of +5° C. as dairy products cannot in any way survive a residence time of more than 5 minutes in the temperature range of −27° C. without aqueous or albumin-bearing constituents being permanently damaged.

The object of the present invention therefore is to permit, by virtue of a specific design configuration of the delivery locations of the distributor apparatus, the storage of the items of a shopping expedition, for example a standardised wire grid-like trolley, during a shopping run of the distributor apparatus and during the subsequent packaging time of the wire grid-type trolley, in such a way that a temperature of −18° C. is not exceeded without cooling in the distribution of frozen items.

According to the invention that is achieved in that the delivery locations are in the form of heat-insulated storage chutes.

The storage chutes bridge over the difference in height between the distributor apparatus and the discharge locations, while the items slide inclinedly downwardly under the influence of the force of gravity. The heat insulation (heat barrier effect) of the storage chutes ensures that the frozen item always remains at a temperature of at least −18° C. or below, even with an ambient temperature of +5° C., as is required for reasons relating to foodstuffs hygiene.

As over 100 storage chutes are often required in distributor apparatuses depending on the respective system size, it is advantageous in terms of a compact structure for the overall installation if the storage chutes are of a tubular configuration and are of a rectangular cross-section.

In regard to the design of the storage chutes, not only a possible rise in temperature of the frozen goods may be taken into consideration, but also excessive cooling of the dairy products. It is particularly critical in this connection if prolonged operation of the distributor apparatus with frozen goods is followed by the commencement of shopping involving dairy products. In order to minimise the cooling influence of the mass of the chute on the dairy products, it is desirable for the storage chutes to be made from a material in regard to which, on the basis of a high specific strength, the required material usage gives a technical minimum in respect of the product "chute mass times specific heat", that is to say for example fiber-reinforced plastic material. For advantageous coefficients of friction of the chute/item material pairing, besides metal sheet, for example steel, plastic coatings of the chute surface have also proven to be advantageous.

For optimum heat insulation or heat barrier effect in respect of the storage chutes, it is desirable for the storage chutes to be coated with an insulating layer. In that respect foam of a thickness of at least 2 cm is particularly suitable.

Figure 2:
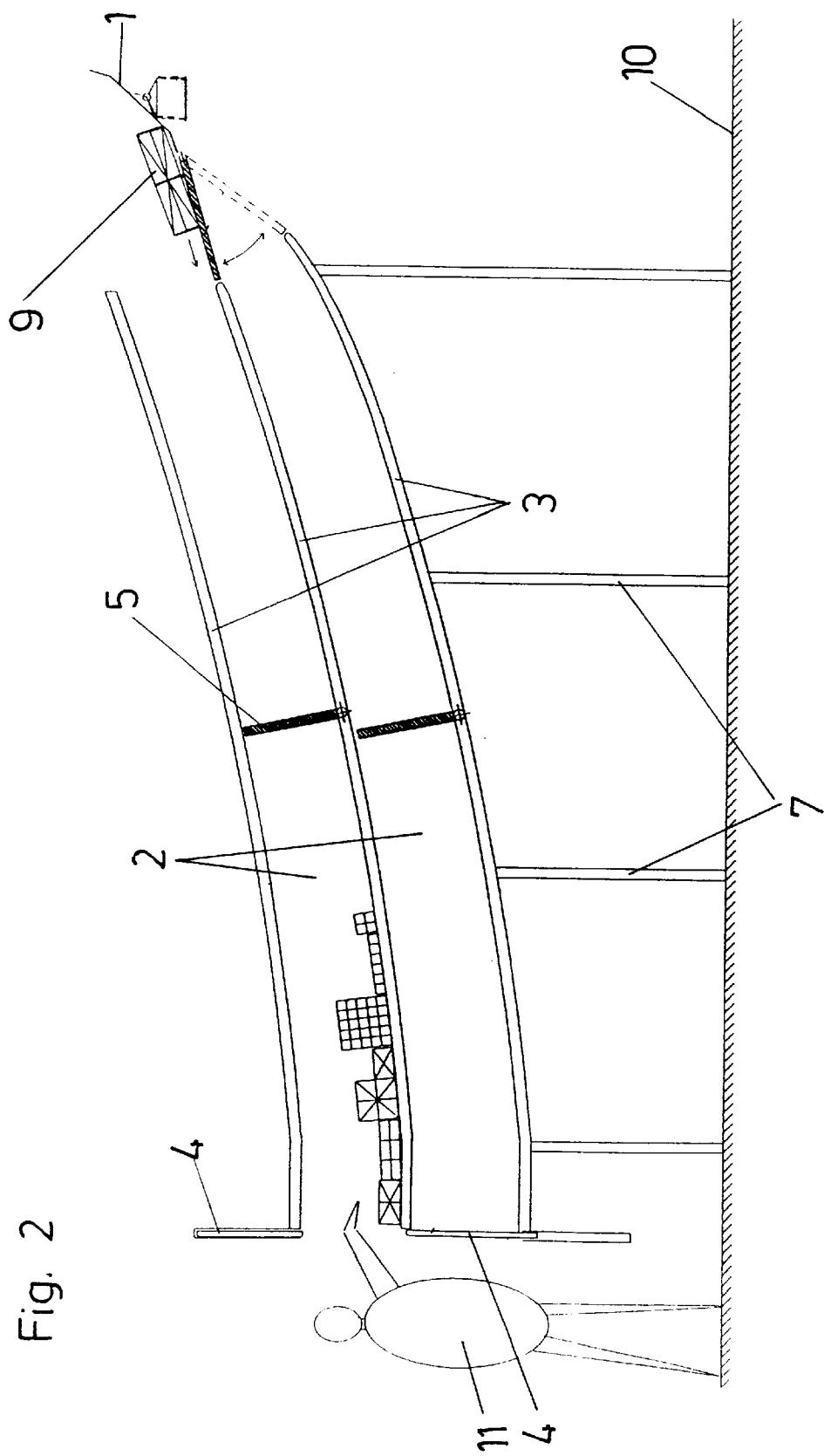

Further features and details of the present invention will be apparent from the specific description hereinafter. In the drawing:

FIG. 1 is a diagrammatic plan view of a distributor apparatus according to the invention, FIG. 2 is a view in longitudinal section through heat-insulated storage chutes which are arranged in a two-layer configuration in superposed relationship, FIG. 3 is a view in cross-section taken along line A—A in FIG. 1, and FIG. 4 is a part of a front view of the distributor apparatus.

Referring to FIGS. 1 and 2, shown therein is the structure in principle of a distributor apparatus according to the invention. The items 9 conveyed by the distributor apparatus 1 are allocated or sorted to a given shopper in accordance with the signals from a control computer (not shown). At their destination the items 9 are thrown by a tilting movement onto the slide flap 6 and slide from there downwardly under the effect of the force of gravity into the associated storage chute 2. The first item 9 of a shop slides down as far as the discharge opening which is closed by a flap or door 4. The subsequent items 9 then follow on, in which case they can also come to lie in juxtaposed and superposed relationship. The flap or door 4 of a discharge location, which like the storage chutes 2 is heat-insulated, remains closed until all items 9 of a shop have been completely put into intermediate storage in a storage chute 2. The fact that a shop order is complete is signalled by means of a display to the packer 11 who then opens the door or flap 4 and begins to load a so-called trolley 12 which is waiting in readiness.

The storage chutes 2 shown in FIG. 2 are provided at the center with remotely actuated barriers 5 by which the storage chutes 2 can be divided into two successive partial segments 2a and 2b. As can be seen from FIG. 2, in that way two shopping units can be implemented in partially overlapping relationship in respect of time, insofar as a finished shop order (n) can be separated from the next shop order (n+1) of another customer, by the actuation of a barrier 5. After termination of the procedure for packing the preceding shop order, the barrier 5 can be lowered so that the next shop order slides down into the handling range of the packer 11.

The structural features of the described embodiment of a distributor apparatus according to the invention can best be seen from FIG. 3. For economic and ergonomic reasons two groups (sometimes also three groups) of storage chutes 2 are arranged in directly superposed relationship at a handling height which is advantageous in terms of working procedure. The number of storage chutes 2 which are arranged in juxtaposed two-layer relationship depends on the system size of the distributor apparatus and can vary between some dozen and a few hundreds of storage chutes. Distribution of the items 9 at a discharge or drop-off location is effected by way of the electromechanical slide flap 6 which guides the items 9 either into the upper or the lower storage chute.

The storage chutes 2 which are of a rectangular configuration in cross-section are formed from thin steel sheet, in logically consistent application of principles of lightweight construction, in order to minimise the heating or cooling influence of the storage chute mass on the frozen or dairy products. High-strength fiber-reinforced plastic materials can be used with the same aim in mind. The storage chutes 2 which are internally smooth or finely coated measure approximately 1.0×0.5 m. For practical reasons they are predominantly one-dimensionally curved along their longitudinal axis which is several meters in length, but it is also possible to imagine a multi-dimensionally curved configuration. The difference in height between the lower edge of the upper storage chute opening, at the sorter side, and the delivery opening which is closed by a flap or door 4, is determined from the structural height of the sorter relative to the floor 10 of the building, and the requirements resulting from the material pairing of storage chute/item. It is necessary to ensure that the individual items 9 close up to each other in the storage chute 2 and slide of their own accord to the delivery opening.

The storage chutes 2 are enclosed on all sides by a heat-insulating layer 3 of foam material. The thickness of the layer 3 is several centimeters, predominantly between 2 and 10 cm. As can be seen from FIG. 3 the storage chutes 2 are supported on the building floor 10 by way of a support structure 7 of steel. The insulation 8 of the support structure 7 additionally prevents heat from being undesirably conducted into the storage chutes 2. Upon assembly of a distributor apparatus according to the invention either storage chutes 2 which are already provided with an insulating layer 3 are fitted together in rows or—as an alternative thereto—it is only after terminating assembly of the storage chutes 2 that the intermediate spaces which occur or the top side and bottom side of the storage chute body are filled with foam. In contrast to the heat-insulating flaps or doors 4 the upper openings of the storage chutes 2, at the sorter side, are not closed in order to save cost, as the heavier cold air, in the case of frozen food shopping, cannot escape upwardly.

In a hybrid mode of operation involving frozen food and dairy products, then as already mentioned the distributor apparatus according to the invention must be operated at an ambient temperature of +5° C. in order to be certain of preventing excessive cooling of the dairy products. The heat insulation of the storage chutes 2 simultaneously ensures that there is no fear of an interruption in the frozen chain for the duration of the shopping procedure and storage of the items in the storage chutes.

Two operating situations are to be considered as being particularly critical in terms of thermodynamic assessment of the distributor apparatus: for frozen food the first operation of filling a storage chute at the beginning of the early shift when the chute material is heated up to about +5° C. and, for dairy products, the first operation of filling a storage chute after prolonged operation involving frozen food, which has cooled the chute material down to temperatures of about −27° C. If those or similar extreme situations occur relatively frequently, it is necessary to take steps in order nonetheless without involving convective cooling to prevent heating of the frozen food to over −18° C. or freezing of the dairy products. Improvements can be achieved by the use of storage chutes comprising fiber-reinforced plastic material with greatly delayed heat absorption and emission. Similar results are achieved by the use of storage chutes of a sandwich structure with a very low heat storage capacity as a result of using a small amount of material. In addition, when beginning work or in the event of a product change from dairy products to frozen food it is possible to prevent a rise in temperature of the frozen food to over −18° C., which gives cause for concern from the point of view of foodstuffs hygiene, by introducing so-called eutectic cooling elements. Likewise, the introduction of eutectic cooling elements of +5° C. or warmer can also prevent cooling to temperatures below the freezing point when changing to shopping involving dairy products.

I claim:

1. A distributor apparatus, which distributes deep-freeze and refrigerated items supplied thereto to individual delivery locations, said distributor apparatus comprising:

at least one storage chute constructed out of a material having a low heat capacity to minimize the transfer of heat from said chute to said items, and an insulating layer surrounding said chute.

2. A distributor apparatus as set forth in claim 1, characterized in that the storage chutes are of a tubular configuration.

3. A distributor apparatus as set forth in claim 1, characterized in that the storage chutes are of rectangular cross-section.

4. A distributor apparatus as set forth in claim 1, characterized in that the storage chutes are formed from sheet metal.

5. A distributor apparatus as set forth in claim 1, characterized in that the storage chutes are formed from fiber-reinforced plastic material.

6. A distributor apparatus as set forth in claim 1, characterized in that the insulating layer comprises foam and is at least 2 cm in thickness.

7. A distributor apparatus as set forth in claim 1, characterized in that the storages chutes have a closable delivery opening.

8. A distributor apparatus as set forth in claim 7, characterized in that the closable delivery opening is in the form of a heat-insulating flap or door.

9. A distributor apparatus as set forth in claim 1, characterized in that barriers are provided for dividing the storage chutes in two longitude portions.

10. A distributor apparatus as set forth in claim 1, comprising at least two of said storage chutes, said storage chutes being arranged in a multi-layered superposed relationship.

11. A distributor as set forth in claim 10, characterized in that the item supplied thereto can be distributed by means of an electromechanical slide flap to two respective storage chutes arranged in mutally superposed relationship.

12. A distributor apparatus as set forth in claim 1, characterized in that the storage chutes can be selectively charged by means of the distributor apparatus with frozen products (−27° C.) or with dairy products (+5° C.).

13. A distributor apparatus as set forth in claim 1, characterized in that the distributor apparatus together with storage chutes are arranged in an environment at a temperature above freezing point.

14. A distributor apparatus as set forth in claim 1, characterized in that the storage chutes are supported on a building floor by means of a support structure.

* * * * *